United States Patent [19]

An

[11] Patent Number: 4,538,789
[45] Date of Patent: Sep. 3, 1985

[54] AUTOMATIC AND MANUAL ACTUATOR

[75] Inventor: Sangchol An, Rolling Heights, Calif.

[73] Assignee: Purex Pool Products, Inc., Lakewood, Calif.

[21] Appl. No.: 490,376

[22] Filed: May 2, 1983

[51] Int. Cl.³ .............................................. F16K 31/02
[52] U.S. Cl. ................................ 251/129.12; 251/248; 74/406
[58] Field of Search .................... 251/134, 248; 74/406

[56] References Cited

U.S. PATENT DOCUMENTS

| Re. 30,224 | 3/1980 | Ortega | 251/DIG. 1 |
|---|---|---|---|
| 2,327,980 | 8/1943 | Bryant | 251/248 |
| 3,180,168 | 4/1965 | Harris | 74/406 |
| 3,334,859 | 8/1967 | Raymond | 251/134 |
| 4,339,110 | 7/1983 | Ortega | 251/309 |

Primary Examiner—William E. Lyddane
Assistant Examiner—Gerald A. Anderson
Attorney, Agent, or Firm—William W. Haefliger

[57] ABSTRACT

Apparatus usable in controlling, both automatically and manually, a valve stopper movable between first and second positions to control fluid flow through the valve, comprises
(a) a power source,
(b) a drive coupling the power source to the stopper to move the stopper between such positions,
(c) an input for transmitting movement between a manual actuator and the stopper to move the stopper between such positions, and
(d) the drive including decoupling mechanism operable in response to the transmission of movement as defined in (c) above to interrupt the coupling of the power source to the stopper.

10 Claims, 8 Drawing Figures

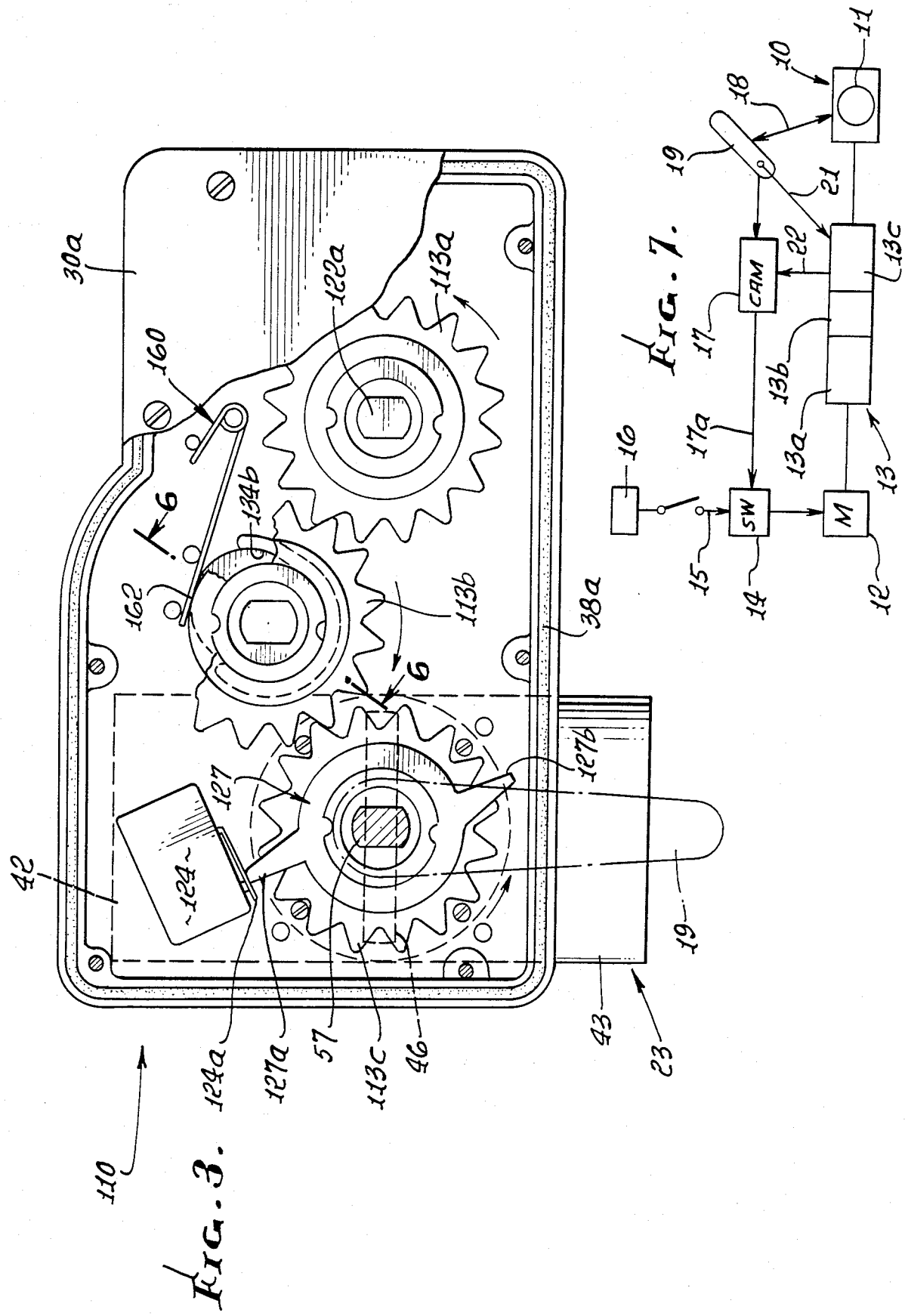

AUTOMATIC AND MANUAL ACTUATOR

BACKGROUND OF THE INVENTION

This invention relates generally to actuators, and more particularly to an actuator to operate a valve stopper and selectively in motorized or manual actuation modes.

U.S. Pat. Nos. 4,339,110 and Re-30,229 disclose lightweight valves especially adapted for use in flow control systems for swimming pools, spas and other applications. Such valves are disclosed in those patents as manually controlled. In recent years, solar heaters have come into use for pools and spas, and there is need for selectively controlling the flow of water to divert it to the heater, or to by-pass same. In view of greater usage of such valves, there is need for a valve actuator which will selectively accommodate motor drive of the valve as well as its manual operation. In particular, there is need for a simple, small size actuator especially adapted for use with valves of the described type, as well as other valves.

SUMMARY OF THE INVENTION

It is a major object of the invention to provide an improved dual mode actuator to meet the above described need. The actuator is adapted to automatically or manually control valve stopper movement between first and second positions to control flow through the valve, and it basically comprises:

(a) a power source,
(b) a drive coupling the power source to the stopper to move the stopper between such positions,
(c) an input for transmitting movement between a manual actuator and the stopper to move the stopper between such positions, and
(d) the drive including decoupling means operable in response to said transmission of movement as defined in (c) above to interrupt the coupling of the drive to the stopper.

As will appear, the drive typically includes a first element (as for example a first gear) driven by the power source; a third element (as for example a third gear) driving the valve stopper; and the decoupling means typically includes a second element (as for example a second gear) cooperating with the first and third elements and movable out of drive transmitting relation with at least one of the first and third elements in response to manually actuated drive transmission to the stopper.

Further, the second element, or gear, may be mounted for guided movement into and out of mesh with the third element or gear, and a spring may urge the second gear toward mesh with the third gear, the spring yielding as the second gear moves out of mesh with the third gear during manual operation of the valve.

In addition, means such as a cam operated switch may be provided to interrupt the power source when the stopper has arrived at either or both of its first and second positions, as referred to.

These and other objects and advantages of the invention, as well as the details of an illustrative embodiment, will be more fully understood from the following specification and drawings, in which:

DRAWING DESCRIPTION

FIG. 3 is a horizontal plan view section on lines 3—3 of FIG. 1, showing motor driven actuation;

FIG. 7 is a system diagram.

DETAILED DESCRIPTION

Figure 1:
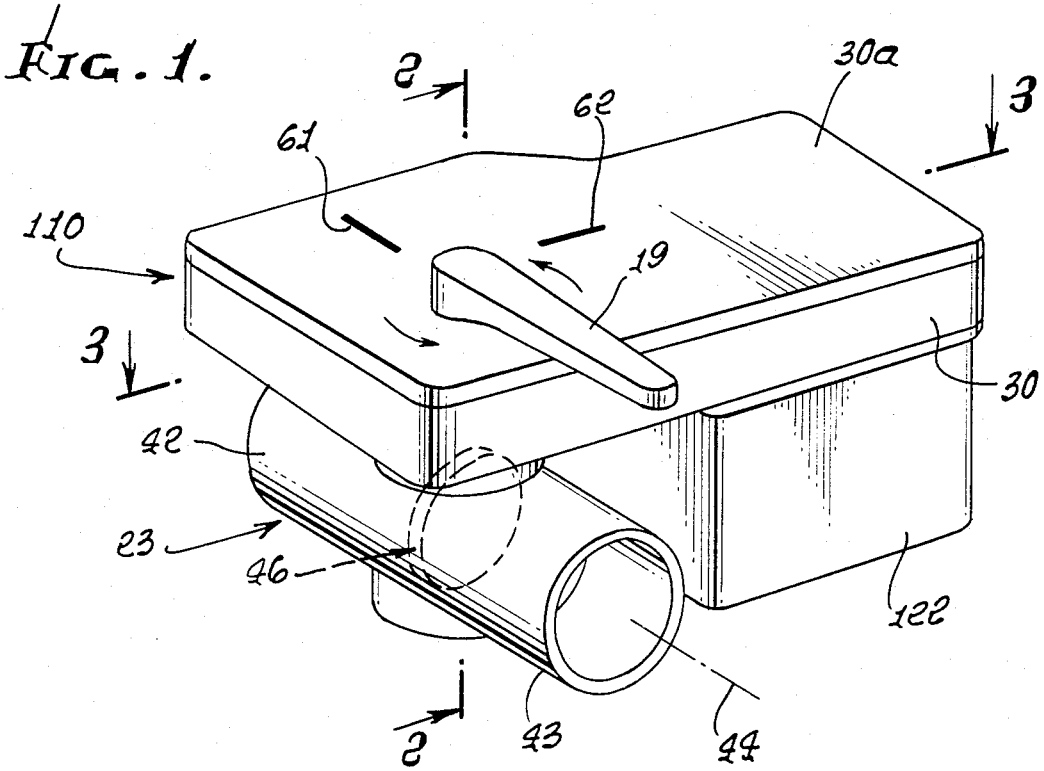
FIG. 1 is a perspective view of a valve and actuator apparatus.
Figure 2:
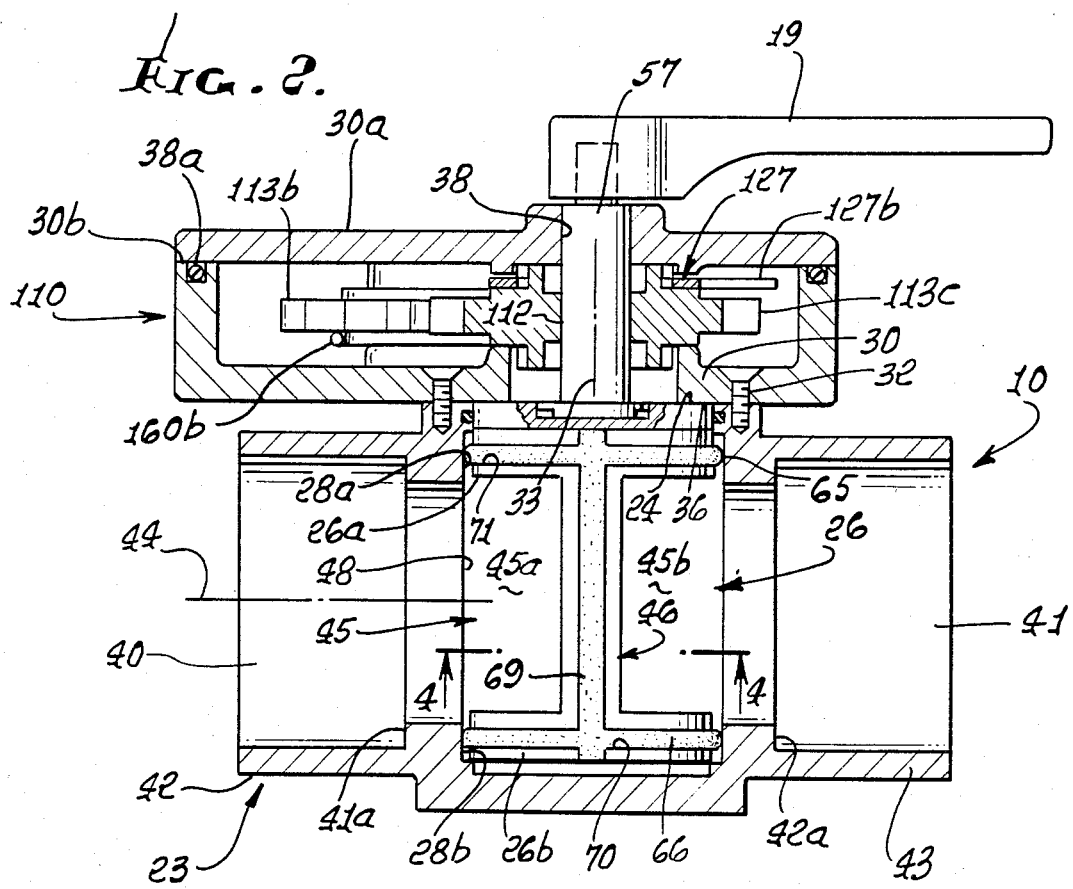
FIG. 2 is a section in elevation on lines 2—2 of FIG. 1.
Figure 5:
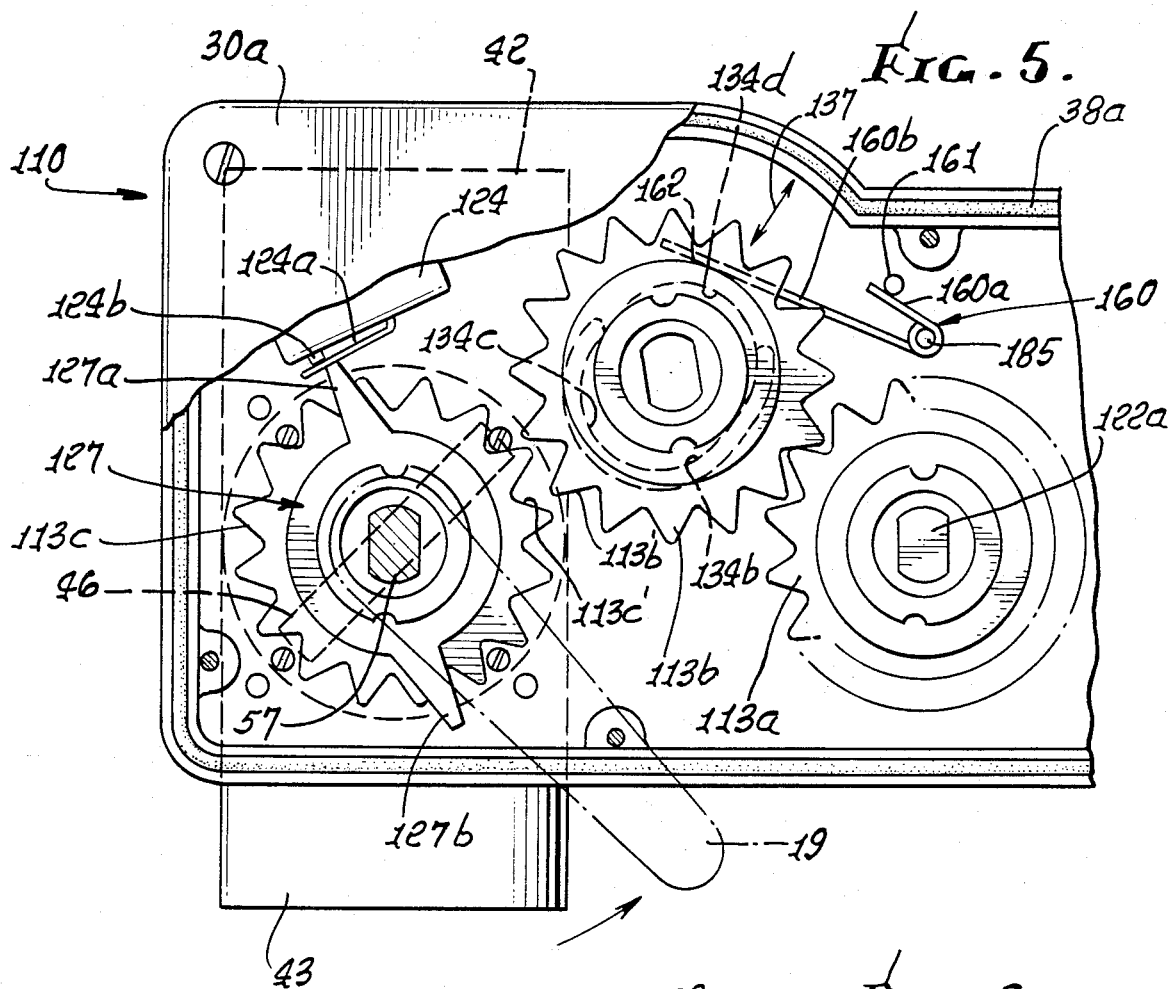
FIG. 5 is a fragmentary view like FIG. 3, showing manual acuation.
Figure 6:
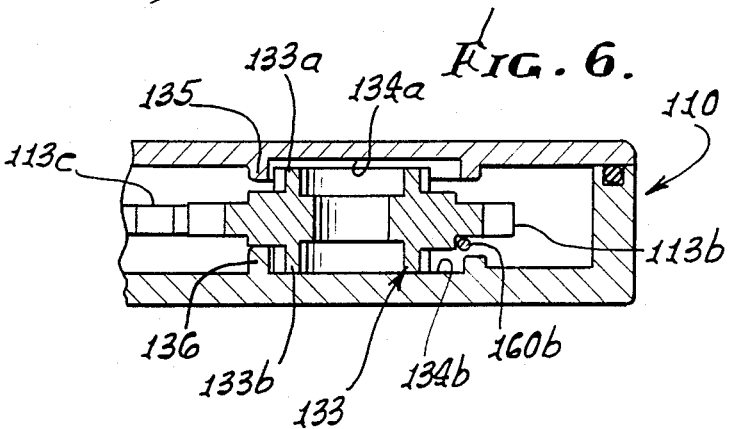
FIG. 6 is an elevation in section on lines 6—6 of FIG. 3.

Referring first to FIG. 7, a valve 10 has a valve stopper 11 movable between first and second positions, as for example OPEN and CLOSED. The stopper may move 180° or through other displacement angles between such positions.

In accordance with the invention, a power source 12 is provided and may take the form of an electrical motor. A drive 13 couples the power source 12 to the stopper to move the stopper between the referenced first and second positions, as for example when the motor is energized in response to ON operation of ON-OFF switch 14. Input at 15 to switch from external circuitry 16 may operate the motor. The drive 13 operates a cam 17 which in turn operates the switch (see link 17a) to OFF position at such time as the motor and drive have displaced the stopper to second position, or back to first position, as the case may be.

Also provided is an input or link, as at 18, for transmitting movement between a manual actuator 19 and the stopper 11 to move the stopper between first and second positions, i.e. from one to the other. To accommodate such manual actuation of the stopper, the drive 13 is provided with decoupling means, indicated at 13b, and operable in response to the described transmission of movement at 18 from handle 19 to stopper 11, thereby to interrupt the coupling of the motor to the stopper. For this purpose, the handle 19 is also shown as linked at 21 to the drive 13. More specifically, the drive may advantageously include interconnectible elements 13a, 13b and 13c through which drive is transmitted in sequence from motor 12 to the stopper, with element 13c connected at 22 to the cam 17 to turn same; element 13c also operated by handle 19 via link 21; and element 13c transmitting motion to the stopper. Element 13b is so coupled to element 13c that it interrupts motion transmission from 13a to 13c when handle 19 is turned.

More specifically, and referring to FIGS. 1-6, the valve 10 may include a body 23 with a rotary valve member or stopper retained within the body. The valve member 26, which is of generally cylindrical construction, is retained in position by a removable closure 30. The closure or cap is secured in position as by fasteners 32 spaced about the longitudinal axis 33 of rotation of member 26. Inner surface 24 of cap 30 slidably engages the end face 36 of the member 26.

The valve member 26 is located within a cylindrical cavity in the body, and has a generally cylindrical surface proximately engaging the cavity wall. In the example, the member 26 includes upper and lower circular sections 26a and 26b which are axially spaced apart. Section 26a has a cylindrical surface loosely interfitting the body cavity cylindrical wall at 28a; and lower section 26b has a cylindrical surface loosely interfitting the cavity cylindrical wall at 28b.

The body member 23 is seen to have first and second ports 40 and 41 formed by laterally oppositely extending tubular portions 42 and 43, the ports having a common lateral axis 44. Tubular ports 40 and 41 are adapted to receive pipe sections, not shown, to seat endwise at steps 41a and 42a. Ports 40 and 41 are thus at laterally opposite sides of the body cylindrical cavity 48, and communicate with a side opening 45 that extends laterally through the valve member, in two sections 45a and 45b. Those sections are at opposite sides of a butterfly closure 46 that extends crosswise of the side opening. Closure 46 may be integral with the remainder of the valve member, and is shown as integral with upper and lower sections 26a and 26b to interconnect them. Note also that the valve member 26 has legs 47 and 48 which extend generally longitudinally, and interconnect the sections 26a and 26b, the legs confining the closure 46 between them, as is clear from FIG. 4, and also having cylindrical surfaces at 47a and 48a loosely interfitting the body cavity wall as at 28a.

The valve member has an open position in which the side opening 45 is in alignment with the ports 40 and 41, with the butterfly closure 46 then in edgewise flow passing alignment with the ports to pass fluid flow through the valve via the side opening sections 45a and 45b.

The valve member also has a closed position (see FIG. 2 and FIG. 4 for example) in which the side opening 45 is also in alignment with the ports (i.e. side opening section 45a aligns with port 40 and section 45b aligns with port 41) but, in this mode the butterfly closure 46 is in flow blocking relation with the ports, to block flow through the side opening 45 and through the valve. In this mode, the butterfly closure side walls 46a and 46b face the respective ports 21 and 20. Note that the closure is generally planar, and rectangular in outline.

Valve handle 19 is connected via stem or shaft 57 with the body 26. The stem extends through a bore 38 in the lid 30a, coaxially with axis 33. Handle 19 aligns with a "closed" indicator 61 on the cap in FIGS. 1 and 3 and is rotatable 90° to align with an OPEN indicator 62 on the cap, at which time closure 46 is in FIG. 4 position.

Means is provided to seal off between the valve member and the valve body, and about the sections 26a and 26b, and along the legs 47 and 48. In this regard, and as shown, the seal means is shown to include first and second rings 65 and 66 about the body sections 26a and 26b, and two like branches 68 and 69 extending longitudinally in association with the valve member legs 47 and 48, and integrally interconnecting said rings. Thus, the rings and branches may consist of elastomeric material such as rubber, whereas the valve body 23 and rotary valve member 26 may consist of molded plastic material.

The valve member contains grooving receiving the seal means about the sections 26a and 26b and along the legs 47 and 48. Such grooving includes ring grooves 70 and 71, and longitudinally elongated grooves 73 and 74. The depths of the grooves are slightly less than the corresponding depth or thickness dimensions of the seal rings and branches, whereby the seal means everywhere projects slightly from the grooves to sealingly engage, with pressure, the body cavity wall 28a.

Figure 4:
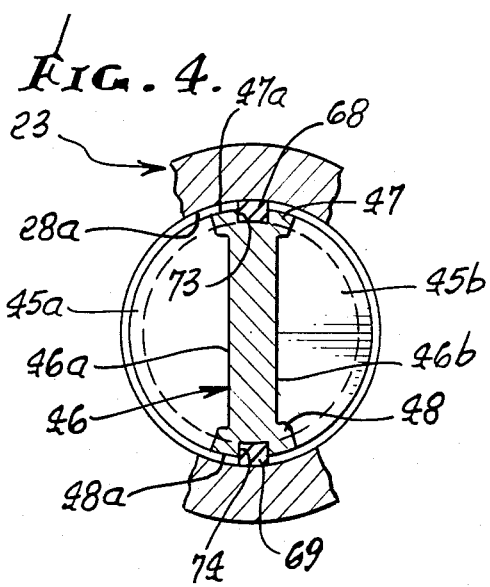
FIG. 4 is a horizontal section on lines 4—4 of FIG. 2.
Figure 4A:
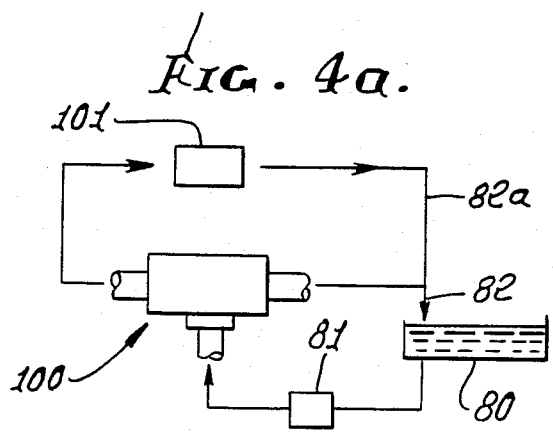
FIG. 4a is a system diagram.

The stopper or member 26 may also be considered to operate as a flow diverter useful in a spool or spa, in a three-way valve construction as shown in FIG. 4a. In one diverter position, pool or spa water is circulated from the pool or spa 80 via filter and/or pump means 81 and the valve 100 to return to the pool at 82. In another diverter position, pool or spa water circulates via 81 and 100 to a solar heater 101, for return at to the pool or spa at 82a and 82. Device 101 may also represent another pool or spa.

In FIGS. 1, 2, 5 and 6, the drive system 13 is shown as incorporated within a housing 110 which includes closure 30 and a cap 30a on the housing 110. Located within the housing are unusually advantageous versions of the interconnectible elements 13a, 13b and 13c in the form of a first spur gear 113a driven by a motor shaft 122a; a second spur gear 113b; and a third spur gear 113c suitably connected at 112 with valve stopper shaft 57, to rotate therewith. Thus link 18 in FIG. 7 may be consolidated in the form of a single shaft 57. A cam 127 (corresponding to cam 17 in FIG. 7) is mounted on gear 113c to rotate therewith, and has diametrically opposite risers 127a and 127b (for example) to operate the ON-OFF switch 124 (corresponding to switch 14 in FIG. 7) that controls the energization of motor 122 seen in FIG. 1. Thus, for example, the risers 127a and 127b may engage the switch arm 124a to cause it to depress the switch contact 124b, as the gear 113c and cam 127 are turned counterclockwise in FIGS. 3 and 5.

The second gear 113b functions as a decoupling means, as referred to in FIG. 7, and has a first position (see FIG. 3) in which it couples or transmits drive from gear 113a to gear 113c when the motor drive rotates the stopper. Gear 113b also has a second position (see FIG. 5) in which it de-couples the drive from gear 113a to gear 113c, as during manual rotation of the valve stopper, as via operation of handle 19. For these purposes, the second gear has a hub 133 providing cylindrical bosses 133a and 133b (see FIG. 6) that are slidably guided in upper and lower slots 134a and 134b formed by guide walls 135 and 136 of the housing 110. Those slots are elongated in a direction indicated by arrows 137 in FIG. 5, i.e. to guide gear 113b toward and away from gear 113c. Ends 134c and 134d limit endwise travel of the gear 113b in directions 137.

Further, the decoupling means may include a spring 160 yieldably urging the second gear 113b toward gear 113c and into mesh with same, gears 113a and 113b remaining in mesh during movement of gear 113b into and out of mesh with gear 113c. Spring 160 may take the form of a torsion spring having arms 160a and 160b respectively engaging a post 161 and the side of gear 113b at 162, in FIGS. 5 and 6. The spring is anchored at 185.

In operation, as motorized drive is transmitted from the gear 113a to gear 113c via gear 113b, the latter is urged by spring 160 to the fully meshed position seen in FIG. 3. If manual operation is effected, the non-rotation of gear 113a together with rotation of gear 113c by the handle serve to decouple gear 113b from gear 113c, gear 113b being pushed away from gear 113c in direction 137 and against the yielding force exerted by spring 160. As the flanks of teeth 113c' of gear 113c push against the flanks of teeth 113b' of gear 113b (see FIG. 5), a ratcheting movement of gear 113b results. Note that the gear teeth have generally triangular shape. Link 21 in FIG. 7 broadly encompasses this function.

In motorized mode, the engagement of either cam riser 127a or riser 127b, with the switch 124, may serve to turn the motor "OFF" after the motor has been energized, and engagement of riser 127a with the switch may correspond to "OPEN" position of the valve stopper, whereas engagement of riser 127b with the switch may correspond to "CLOSED" position of the valve stopper.

Note O-ring 38a sealing off between lid 30a and the rim 30b of closure or box 30.

I claim:

1. For use in controlling, both automatically and manually, a valve stopper movable between first and second positions to control fluid flow through the valve the improvement comprising
   (a) a power source,
   (b) a drive coupling the power source to the stopper to move the stopper between said positions,
   (c) an input for transmitting movement between a manual actuator and the stopper to move the stopper between said positions, and
   (d) the driver including decoupling means operable in response to said transmission of movement as defined in (c) above to interrupt the coupling of said source to the stopper,
   (e) said drive including a first gear driven by the power source, a third gear driving said stopper, and said decoupling means comprises a second gear meshing with the first and third gears and movable out of drive transmitting relation with at least one of the first and third gears in response to manual actuation of the drive,
   (f) and including guide means on a housing for said gears to guide said second gear toward and away from said third gear, the second gear having axially spaced hub structures engaging said guide means to be guided thereby, whereby the second gear directly meshes with the first and third gears,
   (g) said first and second gears remaining in mesh during movement of the second gear toward and away from said third gear, all of said gears remaining in substantially the same plane.

2. The improvement of claim 1 including said valve the stopper of which comprises a flow diverter usable in a pool or spa water circulation system, a housing for said valve, and a housing for said gears located directly above said valve housing and said flow diverter therein, the third gear and stopper having a common axis of rotation.

3. The improvement of claim 2 including said circulation system in communication with said valve.

4. The improvement of claim 1 wherein said input is defined by a stopper actuating stem.

5. The improvement of claim 1 including means connected with the stopper and with said power source to interrupt said power source when the stopper has arrived at either or both of said positions.

6. The improvement of claim 5 wherein said means includes a switch, and a switch operator rotatable in response to stopper rotation.

7. The improvement of claim 6 wherein said operator comprises a cam rotated with the stopper stem, and cam risers on the cam located at approximately diametrically opposite sides of an axis defined by the stem.

8. The improvement of claim 1 wherein said decoupling means includes a spring yieldably urging said second gear into mesh with said first and third gears.

9. The improvement of claim 1 including said valve having a stopper rotating stem connected with said third gear.

10. The improvement of claim 1 wherein said decoupling means includes a device urging said second gear into drive transmitting cooperation with said first and third gears, while accommodating movement of the second gear out of cooperating relation with said third gear in response to manual actuation of said third gear.

* * * * *